United States Patent

Johnston

[15] 3,677,645
[45] July 18, 1972

[54] AUTOMATIC STEREOPLOTTING APPARATUS HAVING A LOW INERTIA SERVO SYSTEM

[72] Inventor: H. Ronald Johnston, Vancouver, British Columbia, Canada

[73] Assignee: Itek Corporation, Lexington, Mass.

[22] Filed: June 1, 1970

[21] Appl. No.: 42,096

[52] U.S. Cl............................................356/2, 250/220 SP
[51] Int. Cl..............................................G01c 11/12
[58] Field of Search................................250/220 SP; 356/2

[56] References Cited

UNITED STATES PATENTS 3,554,645   1/1971   Bertram.....................................356/2

*Primary Examiner*—Ronald L. Wibert
*Assistant Examiner*—Orville B. Chew, II
*Attorney*—Homer O. Blair, Robert L. Nathans and William C. Roch

[57] ABSTRACT

An automatic stereoplotting system employing both a high speed primary servo-system for inducing substantially instantaneous primary relative displacements between scanning patterns to eliminate detected parallax, and a more massive and slower reacting auxiliary servo system for inducing relative displacements between photographs being scanned. The auxiliary displacements of the photographs replace the initial primary displacements of the scanning patterns and a readout mechanism records measured elevations by continuously indicating the algebraic summations of both the primary and auxiliary displacements.

6 Claims, 6 Drawing Figures

INVENTOR:
H. RONALD JOHNSTON,
BY John E. Toupal
ATTORNEY

3,677,645

AUTOMATIC STEREOPLOTTING APPARATUS HAVING A LOW INERTIA SERVO SYSTEM

BACKGROUND OF THE INVENTION

This invention relates generally to dual image registration systems and, more specifically, to an automatic stereoplotting instrument for use in the production of topographic maps.

According to well-known techniques in the field of photogrammetry, stereo perception is employed to obtain elevation and position measurements of terrain imaged on a pair of stereographic photographs. The stereo photographs are positioned in a stereoplotting machine that produces for an operator a stereographic presentation of a particular area of the terrain imaged on the photographs. By inducing appropriate relative displacement of the photographs in a direction corresponding to the direction of separation between the positions from which the photographs were taken, the operator registers image detail and eliminates zero order distortion in the stereo presentation. The magnitude of displacement required to eliminate the distortion, commonly called parallax, is proportional to the relative elevation of the actual terrain imaged on the viewed area of the photographs and is automatically recorded by the stereoplotting machine. Simultaneously recorded for the viewed area is its position in the photographs which identifies the relative position of the actual terrain. Thus, by continuously maintaining registration of the individually viewed image areas, while systematically traversing the entire surface of the two photographs, relative elevation and position information is obtained for all the terrain imaged on the photographs.

Typically, the systematic traversal is accomplished by moving the photographs on an $x-y$ carriage relative to the optical viewing system. While controlling movement of the $x-y$ carriage, the operator continuously adjusts the horizontal displacement between the photographs so as to maintain image registration. Generally the operator is guided during the procedure by the well-known "floating mark." This mark comprises some indicia such as light spots located at the optical axes of the stereo viewing system and when fused into a single spot in the stereo presentation appears to lie on the surface of the stereo terrain model only when the images are properly registered.

Even with the most modern instruments, manual stereoplotting is a tedious and time consuming operation. The time requuired to manually profile a typical stereo model is between 2 and 4 hours, depending on the roughness of the terrain. When functioning to adjust the apparent height of the floating mark by means of a hand or foot wheel, a human operator becomes part of a closed loop feedback system and is subject to some basic limitations. For example, his response, i.e., the time delay between the perception of an error in the height of the floating mark and its subsequent correction by means of the hand wheel, has a definate minimum value making it necessary to reduce traversing speed in rough terrain.

A number of automatic stereoplotting systems have been developed for simplifying the dual image registration procedure. Basically, most such systems scan homologous sections of the two photographs and convert the scanned graphic data into a pair of electrical video signals. By various correlation and analyzation techniques, the video signals are used to produce error signals representing certain types of distortion existing between the scanned image sections. The scanned sections are then rendered congruent by image detail transformation produced in response to the derived error signals. Usually, the $x$-parallax error signal indicative of terrain elevation is applied to a servomechanism that corrects zero order distortion by producing appropriate relative movement between the stereo photographs or height adjustments of a viewing surface that intercepts a projection of the images. As noted above, the magnitude of required $x$-parallax correction is directly related to the relative elevation of the actual terrain and provides the contour information necessary for topographic maps.

The electro-mechanical servomechanisms utilized in automatic stereoplotting instruments, given suitable input, can respond more quickly than a human operator and consequently can substantially reduce the time required to profile a stereo model particularly one involving rapid fluctuations of terrain height. The same servomechanisms, however, also introduce errors in the output information. Because the mechanical assemblies controlled by the servomechanism are relatively massive, an inherent steady state following error is introduced during periods requiring rapid acceleration. Some finite time period is required by the servomechanism, therefore, to effect corrective relative displacements in response to an $x$-parallax error signal derived from discrete scanned sections of the two photographs. The particular image sections being scanned, however, are continuously changed by traversing movement of the $x-y$ carriage retaining the photographs. Thus the elevation indicated by the instantaneous position of the servomechanism does not correspond identically to the $x-y$ coordinate position of the image sections being scanned. Rather, the instantaneous positions of the servomechanism represent the elevation of image sections scanned a finite period earlier. Because of this discrepancy the elevation and position information outputs continuously recorded by the automatic stereoplotting instrument do not exactly correspond.

The object of the invention, therefore, is to provide an improved automatic stereoplotting instrument that eliminates the problems noted above.

CHARACTERIZATION OF THE INVENTION

The invention is characterized by the provision of an automatic stereoplotting system including an $x-y$ carriage for supporting a pair of stereographic photographs. A pair of fixed cathode rays tubes produce scanning beams which are directed through and modulated by image detail retained in distinct areas of the stereographic photographs and drive motors selectively move the carriage in orthogonally related directions so as to change simultaneously and uniformly the areas being scanned. Image detail information extracted by the scanning beams is converted into video analog signals which are correlated and analyzed according to conventional techniques producing an $x$-parallax error signal indicative of $x$-parallax existing between the image areas being scanned.

The parallax error signal is fed directly to a high speed instrument servo whose loads are one input to the readout synchro and a potentiometer. Because the potentiometer and readout synchro have very low mass, high acceleration with low torque requirements are possible. The output from the potentiometer is fed to the $x$-deflection coils of the scanning system which deflect the scanning patterns in the direction required to null the $x$-parallax signal. Voltage adjustments across the potentiometer are such that the synchro is advanced by an amount exactly representing the elevation change that produced the error. Thus, the synchro output indicates the true elevation of the terrain being scanned. The voltage from the potentiometer is also fed to the relatively slow speed $z$-carriage servo system which causes the carriage to move in the direction required to mechanically null the scanning pattern deflections. This has the effect of generating signals at the input to the high speed servo system which are opposite in polarity to the original $x$-parallax signals, causing the output of the potentiometer to revert to zero as the $z$-carriage reaches the true mechanical null. During the period in which the $z$-carriage servo is approaching mechanical null and the high speed servo is reverting to its original zero output condition, their relative motions are cancelled in a differential coupling mechanism at the input to the readout synchro. Consequently, its position remains fixed and its output continues to reflect true elevation. The invention features, therefore, $x$-parallax correction by both scanning pattern deflection and $z$-carriage produced photograph displacement. Together, the two forms of correction provide both the quick response of scanning pattern deflection and the accuracy and increased range of mechanical photograph displacement.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 1:
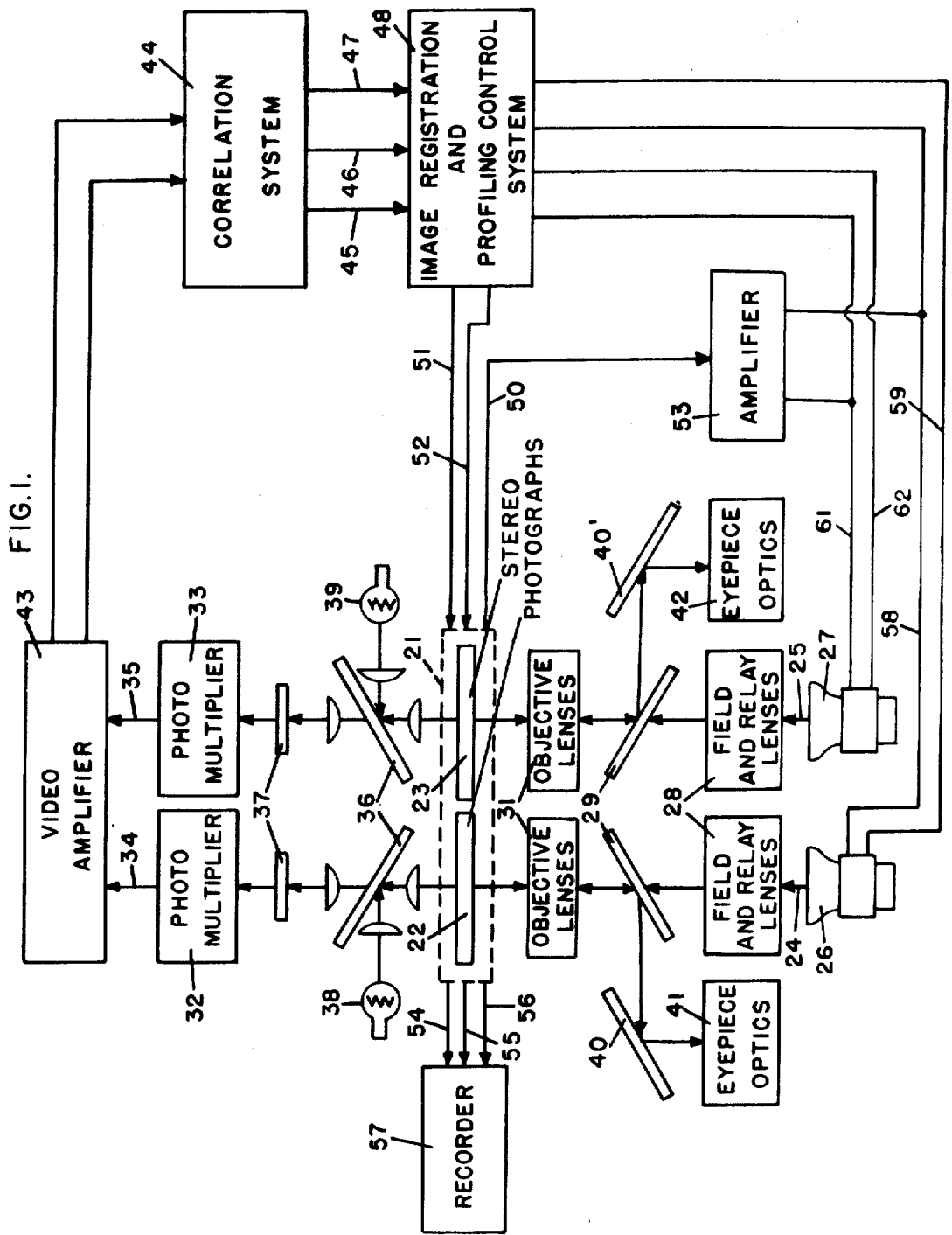
FIG. 1 is a general block diagram illustrating the functional relationship of the main components of the apparatus.

Referring now to FIG. 1 there is shown in block diagram form an image transformation mechanism 21 retaining a pair of stereo photographic transparencies 22 and 23. Scanning beams 24 and 25 produced by, respectively, cathode ray tubes 26 and 27 are directed toward the transparencies 22 and 23 by field and relay lens assemblies 28, dichroic beam splitters 29 and objective lenses 31. After passing through the transparencies 22 and 23 the scanning beams 24 and 25 are received by photomultipliers 32 and 33 that produce on lines 34 and 35, respectively, video analog signals representing the variable detail retained by the photographs. Between the transparencies 22 and 23 and the photomultipliers 32 and 33 the scanning beams pass through lens systems including dichroic mirrors 36 and blue light filters 37.

Also reflected through the transparencies 22 and 23 by the dichroic mirrors 36 is yellow light produced by light sources 38 and 39. After being modulated by the transparencies 22 and 23, the yellow light is directed to a pair of eyepiece optical assemblies 41 and 42 by the objective lenses 31, the dichroic beam splitters 29 and a pair of mirrors 40 and 40'. The eyepiece optical assemblies 41 and 42 provide for a viewer in conventional manner a stereo presentation of the image detail retained by the transparencies 22 and 23.

A correlation system 44 receives the analog signals on lines 34 and 35 after amplification in a video amplifier 43. The correlation system 44 correlates the video signals producing on lines 45 and 46, respectively, x and y cross-correlation signals proportional to the levels of correlatable image detail being scanned in the orthogonally related x and y directions in the photographs 22 and 23. Also produced on line 47 is an orthogonal correlation signal proportional to the degree of relative image detail misregistration existing between the scanned paths. The correlation system 44 does not, per se, form a part of this invention. However, circuits suitable for this application are disclosed in U. S. Pat. Nos. 2,964,644 and 3,145,303 and in U. S. Pat. Application Ser. No. 839,940 of John W. Hardy et al. filed July 8, 1969.

The correlation signals on lines 45–47 are fed into an image registration and profiling control system 48 also not a part, per se, of this invention but described in detail in above noted U. S. Pat. Application Ser. No. 839,940. The control system 48 produces on lines 51 and 52, respectively, x-parallax error and traversing velocity control signals that are applied to the image transformation and transport carriage system 21. Also produced are deflection control signals that are applied on lines 58 and 59 to deflection coils of cathode ray tube 26 and on lines 61 and 62 to deflection coils of cathode ray tube 27.

Generated in the image transformation system 21 on line 50 is a primary displacement control signal that is amplified in a push-pull amplifier 53 and then combined in opposite polarities with the deflection signals on lines 58 and 61. Also supplied by the image transformation system 21 are x and y coordinate position indicating signals on lines 54 and 55, respectively, and a measured elevation signal on line 56. The signals on lines 54–56 are all applied to a conventional recorder 57 that records their information content in graphic form.

Figure 2:
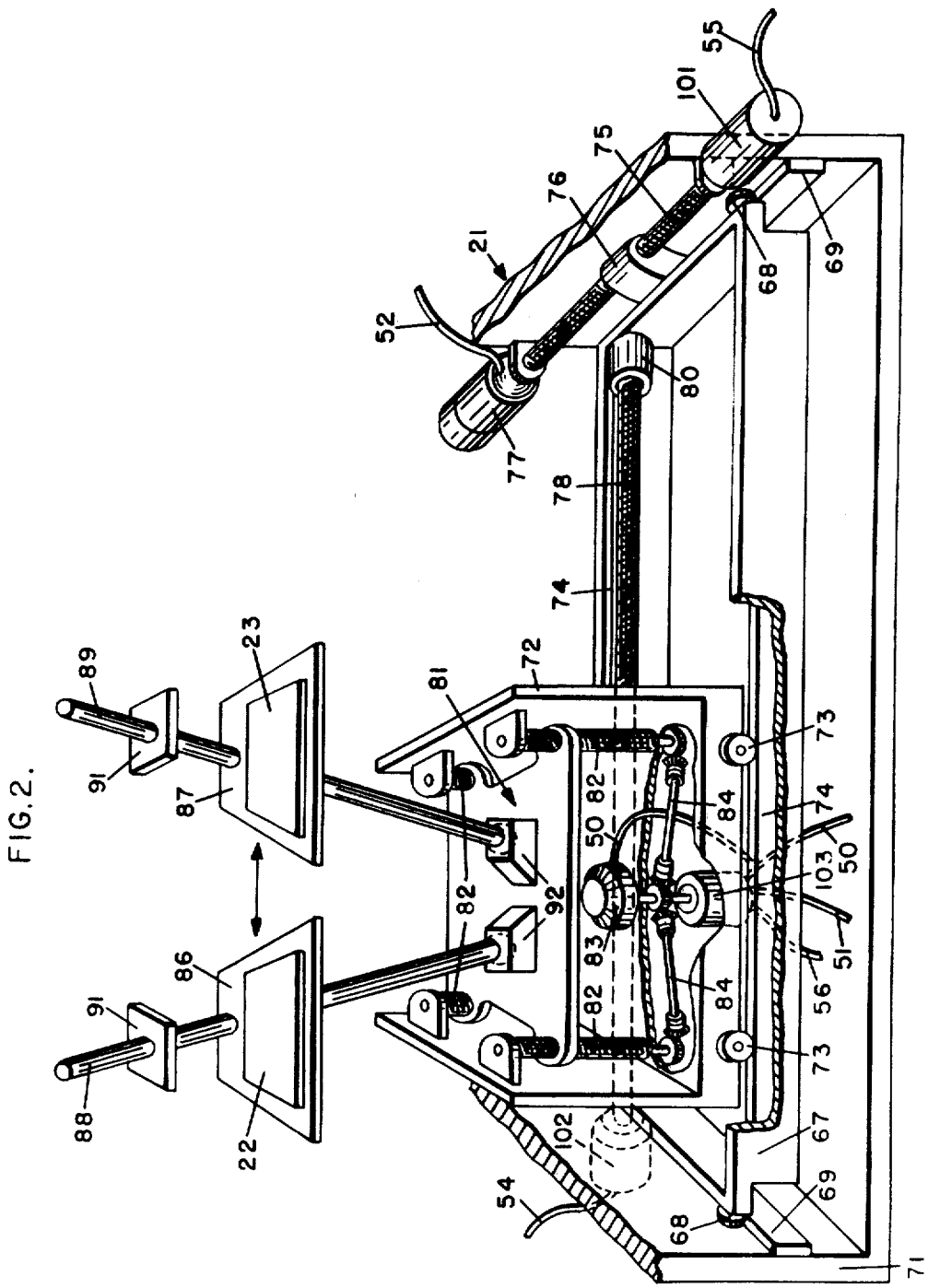
FIG. 2 is a perspective schematic view of the image transformation mechanism 21 shown in FIG. 1.

Shown in FIG. 2 is a schematic perspective view of the dual image transformation system 21 shown in FIG. 1. The transformation system 21 provides controlled movement of the photographic transparencies 22 and 23 in orthogonally related x and y-coordinate directions. A y-carriage 67 is mounted on rollers 68 for movement along parallel y-tracks 69 supported by a frame 71. Similarly, an x-carriage 72 is mounted on rollers 73 for movement along x-tracks 74 supported by the y-carriage 67. Movement of the y-carriage 67 is produced by rotation of a y-lead screw 75 that engages the internally threaded collar 76. Rotation of the lead screw 75 is controlled by a y-servo motor 77 energized by the velocity control signal on line 52. Similarly, movement of the x-carriage 72 along tracks 74 is produced by rotation of an x-lead screw 78 also driven by a suitable x-servo motor 80.

A z-carriage 81 is mounted for vertical movement on z-lead screws 82 supported by the x-carriage 72. Controlled vertical movement of the z-carriage 81 is produced by *z-servo motor 83 energized by the control signal on line 50 and coupled to the* z-lead screws 82 by drive shaft and bevel gear assemblies 84. The photographic transparencies 22 and 23 are mounted, respectively, in photo carriages 86 and 87. Slidably engaging the photo carriages 86 and 87 and providing mechanical coupling thereof to the z-carriage 81 are space rods 88 and 89. Opposite ends of the space rods 88 and 89 terminate, respectively, in pivot connections 91 and ball joint assemblies 92 mounted on the z-carriage 81. The connections 91 and 92 permit oppositely directed arcuate movement of rods 88 and 89 in response to vertical movement of the z-carriage 81. This in turn produces relative rectilinear motion between the transparencies 22 and 23 in the x-coordinate direction defined by x-rails 74 and of a sense determined by the direction of z-carriage 81 movement. The image transformation mechanism 21 is a conventional unit marketed under the trade name Planimat by the Carl Zeiss Company, of Oberkochen, Wurttemburg, Germany. The device is also related to similar transformation systems disclosed in the above noted U.S. Pat. Nos. 2,964,644 and 3,145,303.

In response to appropriate energization of y-motor 77 the photo transparencies 22 and 23 move simultaneously with the y-carriage 67 in either a plus or minus y-coordinate direction defined by y-tracks 69. The speed and direction of movement is determined by the velocity control signal on line 52. Similarly, energization of x-lead screw 78 produces simultaneous movement of the transparencies in either a plus or minus x-direction defined by the x-tracks 74. Thus, the mechanism 21 provides selective uniform two dimensional movement of the transparencies 22 and 23 relative to their respective scanning beams 24 and 25 illustrated in FIG. 1. Conversely, vertical movement of the z-carriage 81 in response to energization of z-servo motor 83 results in relative movement between themselves as well as between the transparencies and the scanning beams 24 and 25. As described below, this action of the z-servo motor 83 in combination with the raster deflections produced by the signal on line 50 aligns the beams 24 and 25 (FIG. 1) with homologous image detail in the transparencies 22 and 23. Consequently, registration is maintained between the image detail being scanned and in the display provided by the eyepieces 41 and 42. The aggregate amount of relative photograph displacement and scanning pattern deflection required to produce this registration is directly related to the actual elevation of the terrain imaged on the sections of the stereo photos being scanned.

In typical operation, the system shown in FIG. 1 is used to profile a stereo model represented by the stereographic transparencies 22 and 23. For example, to profile automatically in the y-coordinate direction, y-motor 77 is driven at a predetermined velocity giving rectilinear motion to y-carriage 67 and the transparencies 22 and 23 relative to the scanning beams 24 and 25. The x-motor 80 forms a part of a positioning servo, that holds the x-carriage 72 rigidly in the x-coordinate direction. The system is thereby constrained to trace out a straight profile in the y-direction and the x-position is selected by an automatic stepping system (not shown) controlled, for example, by a conventional limit switch operated when the y-carriage 67 reaches one edge of the stereo model. In response to actuation of the limit switch, the direction of rotation of y-motor 77 also would be reversed to thereby reverse the traversal direction of the y-carriage 67. Obviously, a reversal in roles of the x and y-motors would result in the tracing of profiles in the x-direction.

As a profile is being traced, a displacement unit 103 (FIG. 2) continuously responds to the x-parallax error signal on line 51 by producing appropriate displacements of the transparencies 22 and 23 and of the scanning rasters to eliminate x-parallax and thereby provide a direct indication of terrain elevation. This operation is described in greater detail below. Simultaneously, y-parallax and other first order distortions are corrected in response to other error signals produced by the control system 57 on lines 58, 59, 61 and 62. Consequently, a viewer utilizing the eyepiece optics 41 and 42 is provided with a corrected stereo presentation of the image scene retained by the transparencies 22 and 23. The correction of y-parallax and other distortions can be achieved in various ways. However, a preferred method involves controlled relative distortion of the cathode ray tube rasters as disclosed in U.S. Pat. No. 3,432,674 of Gilbert L. Hobrough issued Mar. 11, 1969.

During a profiling operation, a y-encoder 101 (shown in FIG. 2) is driven by the y-lead screw 75 to produce an output on line 55 that identifies the position of the y-carriage 67 on track 69. Similarly, an x-encoder 102 is driven by x-lead drive screw 78 to provide on line 54 a signal identifying the position of the x-carriage 72 on track 74. The positions of the x-carriage 72 and the y-carriage 67 also establish the positions of the transparencies 22 and 23 with respect to the fixed optical axes of the lens assemblies 28 and 36. Thus, the signals on lines 54 and 55, respectively, identify x and y coordinate positions of points in the transparencies 22 and 23 aligned with the optical axes. Simultaneously produced by the displacement control unit 103 on line 56 is an output proportional in value to the combined relative displacements of the photographs 22 and 23 and of the scanning beams 24 and 25. As noted above, the displacements required to produce registration of the scanned sections in the transparencies 22 and 23 is dependent upon the relative elevation of the actual terrain imaged thereon. Therefore, the output on line 56 is indicative of that elevation. The related outputs on lines 54-56 are applied to the recorder 57 (FIG. 1) which records the information providing a graphic record of terrain elevations at particular coordinate positions in the transparencies 22 and 23.

As noted above, when profiling photographic areas representing relatively steep terrain, the relatively large mass of the z-carriage 81 prevents the z-servo motor 83 from maintaining accurate registration between areas scanned in the photographs 22 and 23. This problem is obviated in the present invention by the displacement control unit 103 (FIG. 2). As described below in connection with FIG. 3, the displacement control unit 103 provides both the quick response of electronically induced scanning raster displacement and the range and accuracy of physical photograph displacement.

Figure 3:
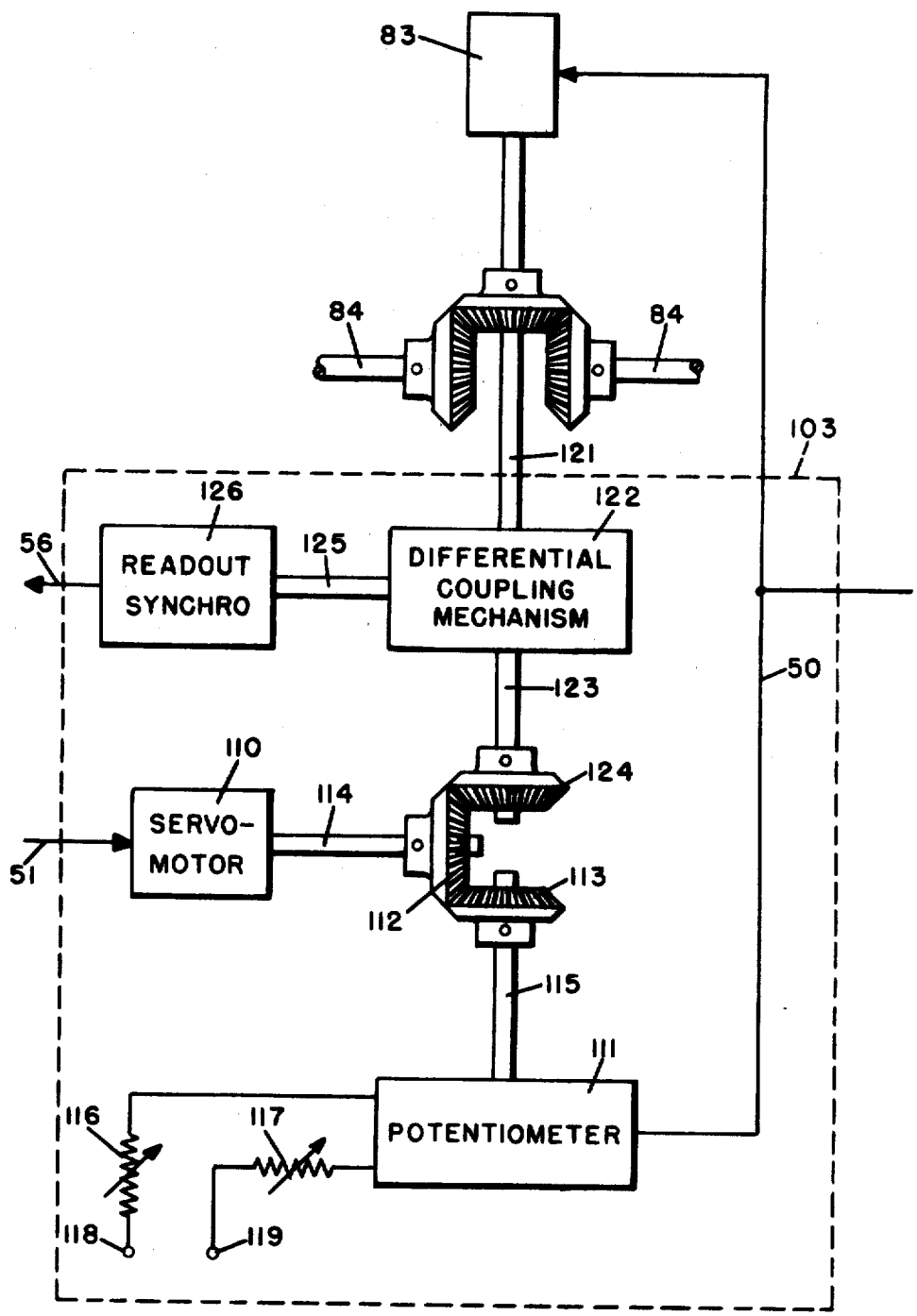
FIG. 3 is a block diagram of the displacement control unit 103 shown in FIG. 2.

As shown in FIG. 3, the unit 103 includes a primary servo motor 110 that is coupled to a potentiometer 111 by engaged gears 112 and 113 keyed, respectively, to a motor shaft 114 and a potentiometer shaft 115. Connected by variable resistors 116 and 117, respectively, to input terminals of the potentiometer 111 are positive and negative voltage sources 118 and 119. The variable output voltage of the potentiometer 111 is applied to the signal line 50 also shown in FIGS. 1 and 2. The servo motor 110 and potentiometer 111 function to provide on line 50 a signal which is the integral of the input parallax signal on line 51.

Also receiving the primary control signal on line 50 is the z-servo motor 83 shown in FIG. 2. The shaft 121 of the z-motor 83 is operatively coupled to z-table drive shafts 84 as described above and to a differential coupling mechanism 122 in the control unit 103. Also operatively coupled to the differential coupling 122 is a shaft 123 driven by the motor shaft 114 via the engaging gears 112 and 124. The output shaft 125 of the differential coupling mechanism 122 drives a readout synchro 126, the signal output of which appears on line 56 also shown in FIGS. 1 and 2.

Figure 6:
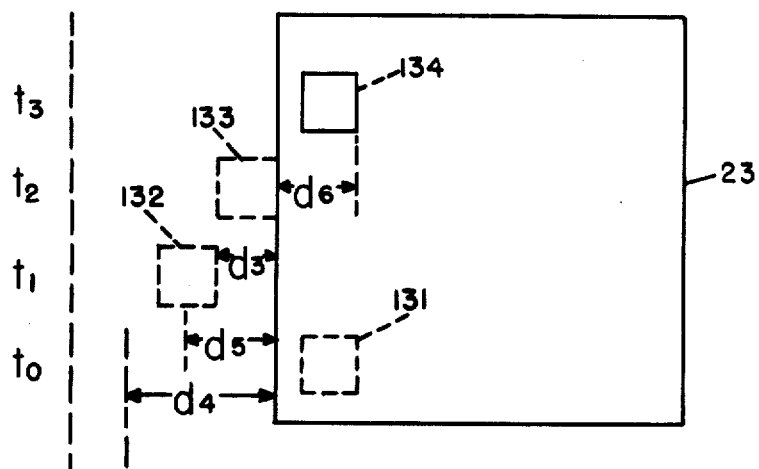
FIGS. 4–6 are diagrammatic representations illustrating operation of the invention under a given set of conditions.
Figure 5:
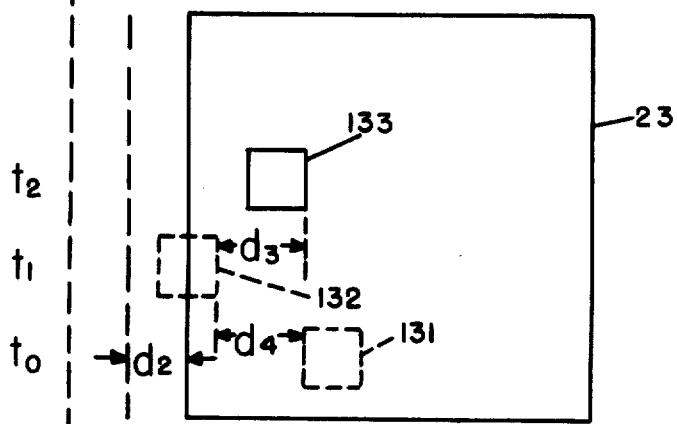
Figure 4:
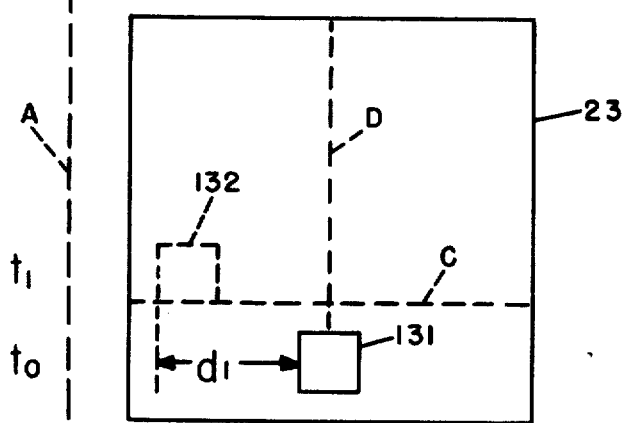

To explain the operation of the control system shown in FIG. 3, reference is now made to FIGS. 4-6. These figures illustrate in diagrammatic form the effect produced on the photographs 22 and 23 and on the scanning beams 24 and 25 by the control system under a given set of hypothetical conditions. The diagrams shown in FIGS. 4-6 are related to each other in both a geometrical and a temporal sense. For reasons of simplicity only the right photographic transparency 23 and the right scanning beam 25 are represented in each of FIGS. 4-6, it being understood that related reactions are experienced by the left photographic transparency 22 and the left scanning beam 24. It should be further noted that the relative dimensions of the photograph 23, the scanning rasters and the various displacements illustrated in FIGS. 4-6 were selected from reasons of clarity and do not accurately reflect the dimensional relationship that would exist between these items in a practical application.

With reference now to FIG. 4, assume that at time $t_o$ the right photograph 23 is positioned as shown relative to the y-direction center line A of the z-carriage 81 shown in FIG. 2. Assume also that the y-carriage 67 is moving the photograph 23 relative to the fixed right cathode ray tube 27 (FIG. 1) in the y-direction indicated by arrow B and that the right scanning beam 25 is tracing a scanning pattern 131. In addition, assume that the upper and lower portions of the photograph 23 retain, respectively, imagery of substantially flat terrain but of different elevation separated by a vertical embankment represented by dotted line C. Under these conditions the scanning pattern 131 will be moving relative to the surface of the photograph 23 along a rectilinear path represented by the dotted line D. Assume finally that at time $t_o$ the left and right photographs 22 and 23 are in perfect registration; i.e., the scanning beams 24 and 25 are simultaneously scanning homologous image detail in the two photographs so that no parallax error signal is present at the output of the image registration system 48 on line 51 (FIG. 1).

As the scanning raster 131 moves across line C, the correlation system 44 (FIG. 1) detects the change in elevation of the imaged terrain and generates a raw error signal on line 47. This in turn generates an x-parallax error signal on output line 51 of the registration system 48. The servo motor 110 (FIG. 3) is energized by the x-parallax error signal and induces rotation of the potentiometer shaft 115 via the mating gears 112 and 113. Rotation of the shaft 115 interrupts the balance in the potentiometer 111 producing an output signal on line 50 that is differentially applied to the x-deflection signal lines 58 and 61 after amplification in the push-pull amplifier 53 (FIG. 1). Application of these signals to the deflection coils of cathode ray tubes 26 and 27 induces relative deflections of the scanning beams 24 and 25 in senses that tend to eliminate the x-parallax detected by the correlation system 44. This result is diagrammatically illustrated in FIG. 4 by the dotted square 132 that represents the position of the right scanning pattern after a deflection of the right scanning beam 25 in a negative x-direction at time $t_1$. Assuming that at time $t_1$ registration again exists, the displacement distance $d_1$ required to establish registration represents the change in elevation of the terrain imaged on opposite sides of line C. A measurement of the magnitude of sense of that displacement and, therefore, of the relative change in elevation is produced on line 56 by the readout synchro 126 (FIG. 3) which is also driven by the servo motor 110 via the mating gears 112 and 124 and the differential coupling mechanism 122. Because the potentiometer 111 and the readout synchro 126 are of relatively low mass, the servo motor 110 is able to substantially instantaneously produce corrected outputs on lines 50 and 56 in response to the reception of x-parallax error signals on line 51. Therefore, continuous registration is maintained by appropriate primary deflection of the scanning patterns traced by the beams 24 and 25. Conversely, the relatively large mass of the z-carriage 81 (FIG. 2) causes an inherent delay in the response of the z-servo motor 83 to control signals on line 50. This delayed response is represented in the simplified example of FIG. 4 by the assumption that at time $t_1$ no movement of the carriage 81 has occurred.

At time $t_2$, however, z-motor 83 has responded to the output signal on line 50 by introducing displacement of the right photograph 23 a distance $d_2$ in a positive x-direction as diagrammatically illustrated in FIG. 5. The relative x-direction positions of the scanning patterns at times $t_0$ and $t_1$ are also shown in FIG. 5 and it is again understood that related displacements are made on left photograph 22. Since movement of photograph 23 relative to the right scanning beam 25 during period $t_1$–$t_2$ tends to eliminate the registration assumed at time $t_1$, and x-parallax error signal is again produced on line 51 by the image registration system 48. The sense of parallax introduced by this movement, however, is opposite to that produced by the assumed change of elevation at line C. The resultant parallax error signal is also of opposite polarity, therefore, and the servo motor 110 (FIG. 3) drives the potentiometer 111 in a direction that reduces the value of the signal on line 50. Consequently the right scanning pattern 133 is deflected a distance $d_3$ in a positive x-direction. As shown in FIG. 5 the deflection $d_3$ of the scanning pattern 133 during time $t_1$–$t_2$ exactly equals the deflection $d_2$ of the photograph 23 during that period so as to retain their existing relative positions and accordingly maintain registration.

During the period between $t_1$–$t_2$, the movement of the z-motor 83 also activates the differential coupling 122. This action, however, is counteracted by the simultaneous activation of the coupling mechanism 122 by the servo motor 110 responding to the x-parallax error signal on line 51. The mechanical coupling between the various components is such that for the assumed case of equal displacements $d_2$ and $d_3$ of, respectively, the photograph 23 and the scanning pattern 133, the position of the coupling mechanism's output shaft 125 remains unchanged. Thus, the output of readout synchro 126 on line 56 remains constant to accurately reflect the uniform elevation assumed to exist for the terrain imaged above line C of the photograph 23. It will be obvious from the above that the output of the readout synchro 126 continuously reflects the algebraic summation of the displacements experienced by the photograph 23 and the right scanning beam 25. Furthermore, that summation accurately represents the total relative displacement required to establish registration and, accordingly represents the elevation of the terrain imagery being scanned. At time $t_2$, for example, the synchro output reflects the combined displacements $d_4$ and $d_2$ of, respectively, the right scanning beam 25 and the right photograph 23. Obviously, that total displacement $d_4+d_2$ corresponds in magnitude to the original scanning beam displacement $d_1$ that established registration at time $t_1$.

As diagrammatically illustrated in FIG. 6, the z-servo motor 83 continues to respond to the potentiometer output on line 50 during time period $t_2$–$t_3$ effecting further displacement of the right photograph 23 in a positive x-direction. Finally, at time $t_3$, the right photograph 23 reaches the relative position shown in FIG. 6. Again, the misregistration induced by this movement results in the generation of x-parallax error signals on line 51 and accompanying energization of the servo motor 110 (FIG. 3). The resultant rotation of the potentiometer shaft 115 reduces the potentiometer output on line 50. Consequently, the right scanning beam 25 is also deflected in a positive x-direction during period $t_2$–$t_3$. At time $t_3$ the right scanning pattern 134 reaches the relative position illustrated in FIG. 6, which position corresponds in the x-direction to its original nulled position assumed at time $t_0$. At that time the potentiometer 111 is in its neutral position and output on signal line 50 is eliminated. The z-servo motor 83 is therefore deenergized and displacement thereby of the right photograph 23 discontinued. As above, the magnitude of the x-direction displacement $d_5$ experienced by the right photograph 23 during time period $t_2$–$t_3$ exactly corresponds to the x-direction displacement $d_6$ experienced by the right scanning beam 25 during that period. Thus, the movement of the motor shafts 114 and 121 are again cancelled by the differential coupling mechanism 122 and the output shaft 125 remains in a constant position.

Reviewing the operations schematically diagrammed in FIGS. 4–6, the system responds to the imaged terrain elevation change assumed at dotted line C (FIG. 4) by inducing substantially instantaneous relative deflections of the scanning beams 24 and 25. The size and direction of the beam deflections are such as to eliminate the parallax introduced by the elevation change. These deflections are represented in FIG. 4 by the distance $d_1$, it again being understood that the left scanning beam 24 experiences a related deflection. The value and sense of the deflection distance $d_1$, therefore, is a measurement of the magnitude and sense of the elevation change assumed at line C and, as described above, a direct indication of that measurement is provided by the readout synchro 126 on line 56 (FIG. 3).

During time period $t_1$–$t_3$, the initially induced primary deflection of the scanning beams 24 and 25 is completely eliminated and replaced by simultaneously induced physical displacements of the photographs 22 and 23. Thus at time $t_3$, the finally induced auxiliary displacement $d_7$ of the right photograph 23 corresponds exactly in size but is of opposite sense to the initially induced primary deflection $d_1$ of the right scanning beam 25. During the period $t_1$–$t_3$ when both primary deflection of the scanning beams and auxiliary displacement of the photographs are occurring, the differential coupling mechanism 122 provides an output on shaft 125 representing the algebraic summation of both types of relative displacement. Thus, the output of the readout synchro 126 continuously indicates the total magnitude of relative displacement required to eliminate parallax between scanned portions of the two photographs and consequently of the relative elevations of the terrain imaged thereon.

Again, it will be understood that the conditions described in connection with FIGS. 4–6 were assumed for reasons of simplifying an explanation of the invention's operation. In light of this explanation, however, the manner in which the disclosed system responds to conditions existing in a more practical application will be obvious. By employing both the primary and auxiliary relative displacements described above, the present invention provides the substantially instantaneous response of electronically induced raster deflection in addition to the overall range and accuracy of physically induced photograph displacement.

Obviously, many modifications and variations of the present invention are possible in light of the above teachings. It is to be understood, therefore, that the invention can be practiced otherwise than as specifically described.

What is claimed is:

1. A stereo instrument for examining left and right stereo photographs of an object and for determining parallax in the left and right stereo photographs and comprising:
   a. means for mounting the left stereo photograph to enable scanning of it;
   b. means for mounting the right stereo photograph to enable scanning of it;
   c. a left scanning system for scanning different points in the left stereo photograph and for producing a signal indicative of the image detail in each scanned point;
   d. a right scanning system for scanning different points in the right stereo photograph and for producing a signal indicative of the image detail in each scanned point;
   e. means for analyzing the signals from said left and right scanning systems to detect parallax between the left and right stereo photographs and for producing a parallax signal indicative of the parallax;

f. means for producing a further signal which is the integral of said parallax signal, said producing means including a relatively low inertia, fast servo system with a servo motor responsive to said parallax signal for driving said relatively low inertia, fast servo system;

g. a relatively high inertia, slow servo system for producing relative movement between said left mounting means and said right mounting means and along an axis to reduce parallax between the left and right stereo photographs, said slow servo system including a servo responsive to said further signal for driving said relatively high inertia, slow servo system;

h. means, responsive to said further signal, for electronically shifting the scanning by said left scanning system along said axis to reduce parallax between the left and right stereo photographs;

i. means, responsive to said further signal, for electronically shifting the scanning by said right scanning system along said axis to reduce parallax between the left and right stereo photographs; and j. means for summing the outputs of said slow servo system and said fast servo system to produce a summed output which is indicative of the total parallax between corresponding points in the left and right stereo photographs.

2. Apparatus as set forth in claim 1 wherein said summing means includes a differential coupling mechanism for mechanically summing the outputs of said slow servo system and said fast servo system.

3. Apparatus as set forth in claim 2 wherein said means for producing a further signal includes a potentiometer means driven by said fast servo system, and said further signal is a signal taken across said potentiometer means.

4. Apparatus as set forth in claim 3 and further including a gear means mechanically driven by said fast servo system, said gear means having two output shafts, one output shaft being drivingly connected to said differential coupling mechanism, and the second output shaft being drivingly connected to said potentiometer means.

5. Apparatus as set forth in claim 1 wherein said means for producing a further signal includes a potentiometer means driven by said fast servo system and said further signal is a signal taken across said potentiometer means.

6. Apparatus as set forth in claim 5 and further including a gear means mechanically driven by said fast servo system, said gear means having two output shafts, one output shaft being drivingly connected to said summing means, and the second output shaft being drivingly connected to said potentiometer means.

* * * * *